United States Patent
Gellert et al.

(10) Patent No.: US 6,323,465 B1
(45) Date of Patent: Nov. 27, 2001

(54) EXTERNALLY HEATED HOT-RUNNER NOZZLE WITH RESISTANCE WIRE

(75) Inventors: Jobst U. Gellert, Georgetown (CA); Andreas Scheffler, Rastatt (DE)

(73) Assignee: Mold-Masters Limited, Georgetown (CA)

( * ) Notice: Subject to any disclaimer, the term of this patent is extended or adjusted under 35 U.S.C. 154(b) by 0 days.

(21) Appl. No.: 09/582,553

(22) PCT Filed: Jan. 8, 1999

(86) PCT No.: PCT/EP99/00080

§ 371 Date: Dec. 20, 2000

§ 102(e) Date: Dec. 20, 2000

(87) PCT Pub. No.: WO99/36246

PCT Pub. Date: Jul. 22, 1999

(30) Foreign Application Priority Data

Jan. 13, 1998 (EP) .................................................. 29800473

(51) Int. Cl.⁷ .............................. H05B 3/06; H05B 3/18; B29C 45/20
(52) U.S. Cl. .......................... 219/421; 219/424; 219/426; 425/549
(58) Field of Search .................................... 219/421, 424, 219/426, 521, 541, 544, 548, 552, 553; 425/549; 222/146.5; 29/611

(56) References Cited

U.S. PATENT DOCUMENTS

| | | | |
|---|---|---|---|
| 3,607,475 | * 9/1971 | Schrewelius | 156/6 |
| 4,403,405 | * 9/1983 | Gellert | 29/611 |
| 4,446,360 | * 5/1984 | Gellert | 219/421 |
| 4,557,685 | * 12/1985 | Gellert | 425/549 |
| 5,051,086 | * 9/1991 | Gellert | 425/549 |
| 5,266,023 | * 11/1993 | Renwick | 425/549 |
| 5,282,735 | * 2/1994 | Gellert | 425/549 |
| 5,421,716 | * 6/1995 | Gellert | 425/549 |
| 5,507,636 | * 4/1996 | Gellert | 425/549 |

FOREIGN PATENT DOCUMENTS

| | | | |
|---|---|---|---|
| 1 615 121 | * 10/1967 | (DE) . | |
| 0 069 997 A1 | * 7/1982 | (EP) | H05B/3/48 |
| 996666 | * 12/1951 | (FR) . | |
| 2193530 | * 2/1974 | (FR) | H05B/3/42 |

* cited by examiner

Primary Examiner—Joseph Pelham
(74) Attorney, Agent, or Firm—McDonnell Boehnen Hulbert & Berghoff

(57) ABSTRACT

An externally heated hot-runner nozzle for producing injection molded parts has a resistance wire which is composed of an inner electric heating conductor, a ceramic insulating intermediate layer and an outer metal sheath and comprises two end portions to which a heating voltage can be applied, as well as an intermediate section which in the form of a heating coil is assigned to the circumference of the hot-runner nozzle. The resistance wire is characterized in that the two end portions having an outer diameter of 1.5 mm to 2.5 mm are dimensioned to be larger than the intermediate section having an outer diameter of 1.0 mm to 1.8 mm.

10 Claims, 1 Drawing Sheet

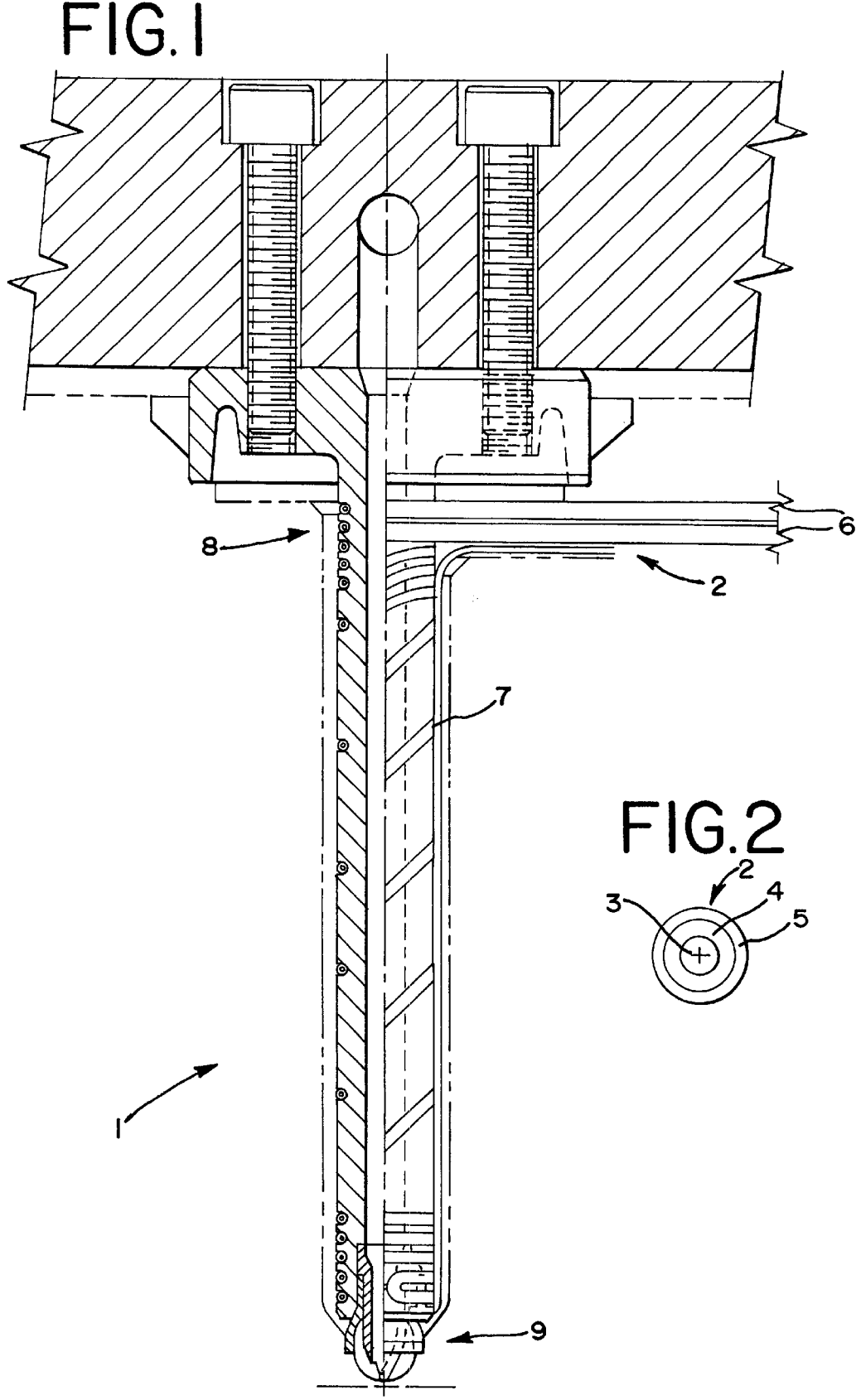

EXTERNALLY HEATED HOT-RUNNER NOZZLE WITH RESISTANCE WIRE

The present invention relates to an externally heated hot-runner nozzle and, in particular, to the resistance wire (heating cable) thereof.

Plastic moldings are produced by injection molding using such a hot-runner nozzle. It is the function of the nozzle to guide the melt from the hot-runner manifold through the melt passage to the gate. Heat losses which are detrimental to the viscosity required for the melt in the melt passage of the nozzle are compensated by the resistance wire which is wound around the nozzle body in the form of a heating coil. Thus the resistance wire guarantees constant isothermal conditions along the melt passage.

Such a hot-runner nozzle is known and marketed by the company Mold-Masters Ltd.

The connection between the resistance wire and the voltage source is established via relatively large connector plugs, so-called terminals. Said terminals require a lot of space, which limits the use of several hot-runner nozzles in one module. Moreover, said terminals are prone to power disconnection, one reason being e.g. that the resistance wire burns out during heating or during control of the set temperature at a voltage within the low-voltage range. Finally, the high temperatures of the resistance wire effect undesired changes in the material in the area of the connections because the resistance wire is exposed to air at said place. This results in embrittlements, which may cause the resistance wires to break.

It is therefore the object of the present invention to provide a hot-runner nozzle which can be heated without any trouble for a long time, which is connected with the aid of simple electrical connections to the voltage source and which shows a reduced heat development in the area of the connections.

Said object is achieved by the subject matter of claim 1.

The advantage of the present invention is that the resistance wire only starts to heat at the nozzle body while a permanently lower temperature is set in the end portions of the resistance wire as compared with the heating portion. As a result, the terminal which requires a lot of space because of its heat-resistant construction can be replaced by a normal connection provided between resistance wire and voltage source, which need not have any special heat-resistant characteristics. Such a simple connection is more space-saving than the terminal which has so far been used, whereby the flexible use of the hot-runner nozzle, in particular in modular manifolds, is extended. In addition, a simple connection is less expensive than a complicated terminal.

Furthermore, since the terminal can be dispensed with thanks to the invention, this has the advantage that the nozzle heating unit can be supplied with power in a trouble-free manner not only from a source of standard voltage, but also from a source of low voltage. This is of great importance as compact nozzles of a small constructional size can only be operated with a low voltage because the application of a standard voltage would cause the resistance wire in such nozzles to burn out.

Finally, the temperatures achieved with the present invention at the end portions of the resistance wire are sufficiently low to prevent any oxidation of the resistance wire on the air-exposed portions. This enhances the service life of the resistance wires of the invention considerably.

Preferred embodiments and improvements of the invention are indicated in the subclaims.

Advantageously, the intermediate section of the resistance wire can be heated to temperatures of up to 600° C., so that the necessary flowability of the melt in the melt passage is ensured. To achieve such a condition, the voltage applied to the end portions may be in the low-voltage range, in particular of up to 50 V. A preferred d.c. voltage of 24 V makes it possible to give the heating element a more compact design and thus to make the insulating intermediate layer thinner without provoking the development of leakage current. As for the structure of the resistance wire, it has been found to be an advantage that a heating conductor of a chromium-nickel alloy exhibits excellent heating characteristics. An efficient insulation of the current-carrying heating conductor which prevents or at least reduces leakage current is efficiently achieved by a ceramic insulating intermediate layer which consists essentially of MgO. Said insulating intermediate layer, in turn, is surrounded by a metal sheath which consists of oxidation-resistant steel, in particular of stainless steel. This ensures sufficient strength and stability of the resistance wire. Advantageously, the end portions of the resistance wire are arranged in the area of the entry end of the nozzle, and a 180° bend of the resistance wire is arranged in the area of the exit end. Such an arrangement of the resistance wire is preferred for a uniform and efficient heating of the melt passage from the circumference of the nozzle.

The present invention shall now be described in more detail with reference to embodiments taken in conjunction with the drawing, in which FIG. 1 is a lateral view of a hot-runner nozzle, the right half of which is a non-cut section and the left half of which is a cut section; and FIG. 2 is a cross section through the resistance wire according to the invention.

In FIG. 1, the left half of the hot-runner nozzle 1 is cut for clearly illustrating the resistance wire of the invention whereas the right half is a top view on the nozzle 1. The nozzle 1 shown in FIG. 1 is a small-sized nozzle having an outer diameter of 7 mm to 12 mm. It goes without saying that the invention is not limited to such a type of nozzle but can be applied to every other type of nozzle which is heated with the help of a resistance wire.

The hot-runner nozzle 1 connects the manifold to the gate and to the mold positioned behind the gate. The melt is here passed from the manifold through the melt passage of the nozzle, which is tapered in the area of the nozzle tip, to the gate and further into the mold. The left wall of the melt passage is shown in broken line because of the illustration which is cut at half the side.

The half-cut illustration of the hot-runner nozzle shown in FIG. 1 makes it possible to clearly recognize the inventive differences in the diameters of the two end portions 6 and the intermediate portion 7 of the resistance wire 2. An essential feature of the invention is that the outer diameter of the end portions 6 with dimensions ranging from 1.5 to 2.5 mm is provided with dimensions greater than those of the outer diameter of the intermediate portion 7, which range from 1.0 to 1.8 mm. Excellent heating characteristics are achieved with a resistance wire 2 whose end portions 6 have a diameter of 1.55 mm and whose intermediate portion 7 has a diameter of 1.20 mm.

For the purpose of heating the nozzle 1 over the entire length thereof, the resistance wire 2, in particular the thick end portions 6 thereof, is moved in the area of the nozzle entry end 8 to the nozzle body. The resistance wire 2 is wound on the circumference of the nozzle body in the form of a coil towards the exit end 9 of the nozzle 1. In the area of the entry end 8 and of the exit end 9 of the nozzle 1, i.e. in the area of the nozzle flange and nozzle tip, the resistance wire 2 is wound more closely than on the remaining nozzle body. The increased heat supply obtained thereby serves to stabilize the heat balance in the nozzle flange (nozzle head portion) and on the nozzle tip to prevent increased heat losses caused by contact within the mold and by cooling, for instance particularly in the gate.

The power which is converted in the resistance wire 2 as heat depends on the current intensity, the specific resistance of the resistance wire 2 and the length and cross-sectional area thereof. The power converted as heat increases with a decreasing cross-sectional area, resulting in a higher temperature in the corresponding part of the resistance wire 2. Thanks to a suitable selection of the cross-sectional area of the resistance wire 2, the intermediate portion 7 can be heated to a temperature of up to 600° C., while a temperature of about 120° C. is obtained in the end portions 6. In contrast thereto, the temperature of the end portions used to be between about 400° C. and 500° C. in the prior art.

It is possible to provide specific sections in the intermediate portion of the wire 2 with a further reduced diameter, whereby the increased heat supply can be controlled in a targeted manner in specific portions of the nozzle. For instance, the measure to enhance the heat supply in the area of the nozzle tip by the narrowly wound resistance wire 2 can be further intensified, which helps to further compensate for the heat losses which are increased in the area of the nozzle tip by the gate cooling.

As has already been mentioned, the power converted into heat also depends on the length of the resistance wire 2. Of course, the temperature difference between the end portions 6 and the intermediate portion 7 can also be achieved by setting a suitable length for the resistance wire.

The connection between the end portions 6 of the resistance wire 2 and the electric conductors of the voltage source are not shown in the figures. However, it goes without saying that each electrical connection between resistance wire 2 and voltage source may be used; the end portions 6 make it possible due to their relatively large cross sections to use, in particular, connections designed for low temperature ranges. Thus the temperature of about 120° C. of the end portions 6 of the resistance wire 2 makes it possible to dispense with the terminal. The use of the terminal has so far been imperative for permanently connecting the end portions 6, which had a temperature of about 400° C. to 500° C. because of their relatively small cross-section, to the electric lines of the power supply. It is only with the help of the end portions having a larger diameter that it is possible to use—due to the low resulting temperature—conventional connections for establishing a contact between the power supply and the resistance wire 2. Such conventional connections permit a mechanically firm connection of the electric lines without regard to any special temperature conditions. Of course, the invention may also be applied to a resistance wire with one end, whose other end is grounded at the nozzle tip.

The cut portion of the nozzle illustrated in FIG. 1 shows that the resistance wire 2 is in direct contact with the nozzle 1. The resistance wire 2 is accommodated in a receiving groove in the case of which the connection between resistance wire 2 and groove wall is established by brazing. Optimum conditions for the heat transition between resistance wire 2 and nozzle body are thereby created.

FIG. 2 shows a resistance wire in cross section. As can clearly be seen the electric heating conductor 3 is surrounded by the insulating intermediate layer 4 and the metal sheath. The thickness of the insulating intermediate layer consisting of MgO or a similar ceramic material is important for preventing or reducing a leakage current which reduces the efficiency of the resistance wire 2. Thus, in the intermediate section 7 of the resistance wire 2, particular attention must be paid that the decrease in cross section does not affect the insulating effect of the intermediate layer, which is ensured by the diameter ranges claimed.

What is claimed is:

1. Externally heated hot-runner nozzle (1), in particular hot-runner nozzle (1) having an entry end (8) and an exit end (9) for producing injection-molded parts, comprising a resistance wire (2) which is composed of an inner electric heating conductor (2), a ceramic insulating intermediate layer (4) and an outer metal sheath (5) and comprises two end portions (6) to which a heating voltage can be applied, as well as an intermediate section (7) which in the form of a heating coil is assigned to the circumference of the hot-runner nozzle (1), characterized in that the two end portions (6) having an outer diameter of 1.5 mm to 2.5 mm are dimensioned to be larger than the intermediate section (7) having an outer diameter of 1.0 mm to 1.8 mm.

2. The hot-runner nozzle (1) according to claim 1, characterized in that the intermediate section (7) can be heated to temperatures of up to 600° C.

3. The hot-runner nozzle (1) according to claim 2, characterized in that the voltage which can be applied to the end portions (6) is within the low-voltage range.

4. The hot-runner nozzle (1) according to claim 3, characterized in that the voltage which can be applied to the end portions (6) is up to 50 V.

5. The hot-runner nozzle (1) according to claim 4, characterized in that the voltage which can be applied to the end portions (6) is 24 V.

6. The hot-runner nozzle (1) according to claim 1, characterized in that the heating conductor (3) consists of a chromium-nickel alloy.

7. The hot-runner nozzle (1) according to claim 1, characterized in that the two end portions (6) of the resistance wire (2) are positioned in the area of the entry end (8) of the nozzle, and a 180° bend of the resistance wire (2) is positioned in the area of the exit end (9).

8. The hot-runner nozzle (1) according to claim 1, characterized in that the outer metal sheath (5) of the resistance wire (2) consists of an oxidation-resistant steel.

9. The hot-runner nozzle (1) according to claim 8, characterized in that the oxidation-resistant steel of the outer metal sheath (5) is a stainless steel.

10. The hot-runner nozzle (1) according to claim 1, characterized in that the ceramic insulating intermediate layer (4) consists essentially of MgO.

* * * * *